US012172115B2

(12) United States Patent
Ugarte

(10) Patent No.: US 12,172,115 B2
(45) Date of Patent: Dec. 24, 2024

(54) METHODS FOR WETTING FILTRATION MEDIA UTILIZED IN ADDITIVE MANUFACTURING PROCESSES

(71) Applicant: General Electric Company, Schenectady, NY (US)

(72) Inventor: Johnnattan T. Ugarte, Evendale, OH (US)

(73) Assignee: General Electric Company, Evendale, OH (US)

( * ) Notice: Subject to any disclaimer, the term of this patent is extended or adjusted under 35 U.S.C. 154(b) by 747 days.

(21) Appl. No.: 17/316,878

(22) Filed: May 11, 2021

(65) Prior Publication Data
US 2022/0362702 A1 Nov. 17, 2022

(51) Int. Cl.
B01D 46/00 (2022.01)
B29C 64/153 (2017.01)
B29C 64/35 (2017.01)
B29C 64/364 (2017.01)
B33Y 10/00 (2015.01)
(Continued)

(52) U.S. Cl.
CPC ..... B01D 46/0035 (2013.01); B01D 46/0047 (2013.01); B29C 64/153 (2017.08); B29C 64/35 (2017.08); B29C 64/364 (2017.08); B33Y 10/00 (2014.12); B33Y 40/00 (2014.12); B01D 2259/45 (2013.01); B29C 64/357 (2017.08)

(58) Field of Classification Search
CPC ....... B01D 46/00; B29C 64/153; B29C 64/35; B29C 64/364; B33Y 10/00; B33Y 40/00
See application file for complete search history.

(56) References Cited

U.S. PATENT DOCUMENTS 8,794,263 B2 8/2014 Scott et al.
9,962,635 B2 5/2018 Stewart et al.
2011/0265893 A1 11/2011 Scott et al.
(Continued)

FOREIGN PATENT DOCUMENTS

CN 205127649 U 4/2016
CN 105642891 A 6/2016
(Continued)

OTHER PUBLICATIONS

Zhang et al. CN 109045855A (Year: 2018).*
(Continued)

Primary Examiner — Sharon Pregler
(74) Attorney, Agent, or Firm — Dinsmore & Shohl LLP

(57) ABSTRACT

A method for wetting volatile material positioned on a filter from an additive manufacturing process includes passing a passivation fluid to an interior space of a filtration system including an outer housing, a filtration medium, detecting an amount of passivation fluid passed to the interior space with a volume detection device, determining whether the amount of passivation fluid passed to the interior space is less than a configurable threshold, in response to determining that the amount of passivation fluid passed to the interior space is less than the configurable threshold, continuing to pass the passivation fluid to the interior space, and in response to determining that the amount of passivation fluid passed to the interior space is not less than the configurable threshold, stopping the passing of passivation fluid to the interior space.

8 Claims, 7 Drawing Sheets

(51) Int. Cl.
  *B33Y 40/00* (2020.01)
  *B29C 64/357* (2017.01)

(56) References Cited

U.S. PATENT DOCUMENTS

| | | |
|---|---|---|
| 2017/0232552 A1 | 8/2017 | Crear et al. |
| 2017/0361377 A1 | 12/2017 | Guerrier et al. |
| 2018/0133637 A1 | 5/2018 | Stammberger et al. |

FOREIGN PATENT DOCUMENTS

| | | | | |
|---|---|---|---|---|
| CN | 207667301 U | | 7/2018 | |
| CN | 109045855 A | * | 12/2018 | ......... B01D 46/0019 |
| CN | 109807328 A | | 5/2019 | |
| CN | 209681157 U | | 11/2019 | |
| DE | 102014207160 A1 | | 10/2015 | |
| FR | 3100987 A1 | | 3/2021 | |
| IN | 108115131 A | | 6/2018 | |
| WO | 2016147443 A1 | | 9/2016 | |
| WO | 2019179799 A1 | | 9/2019 | |

OTHER PUBLICATIONS

Extended European Search Report for Application No. 22167599.4 dated Sep. 29, 2022 (7 pages).
Chinese Patent Office Action for Application No. 202210497112.7 dated Dec. 21, 2023 (13 pages with English Translation).

* cited by examiner

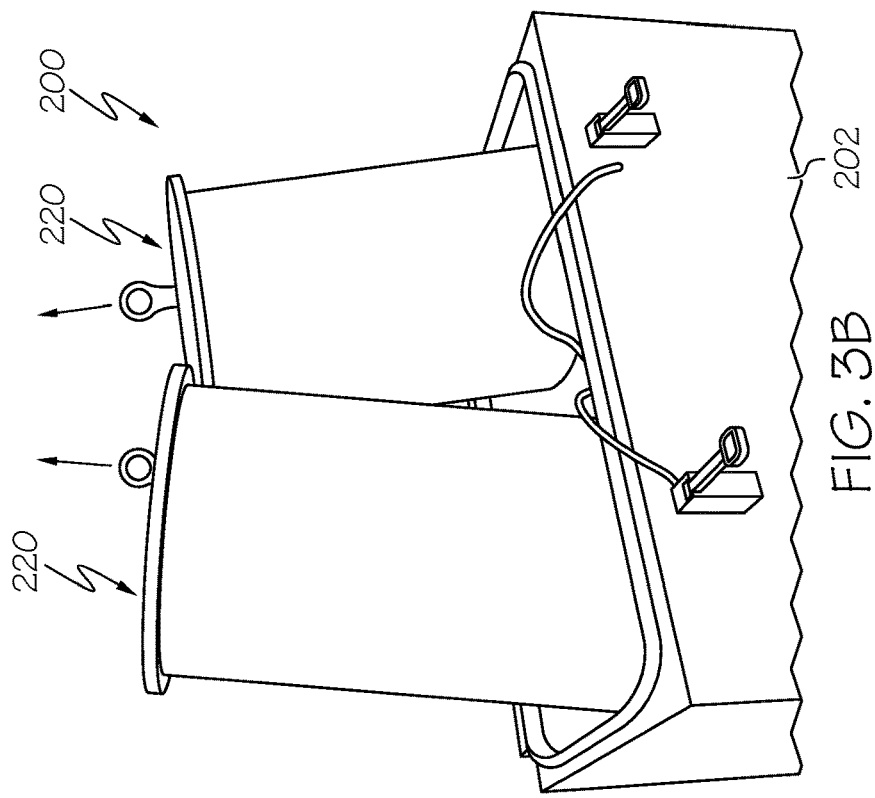
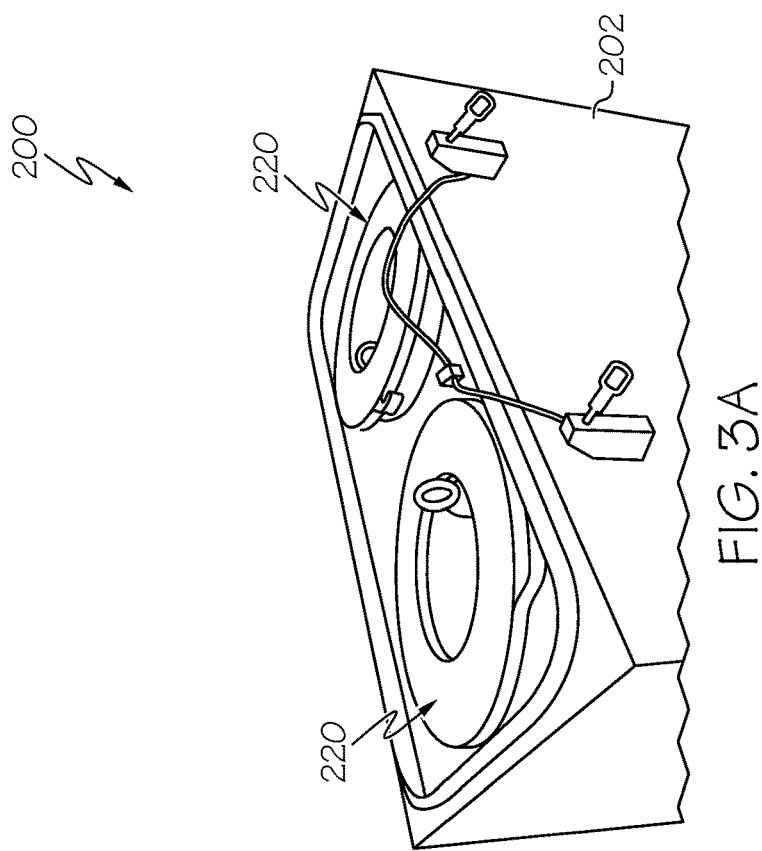
FIG. 3B
FIG. 3A

METHODS FOR WETTING FILTRATION MEDIA UTILIZED IN ADDITIVE MANUFACTURING PROCESSES

FIELD

The present specification generally relates to methods for wetting filtration media utilized in additive manufacturing processes.

TECHNICAL BACKGROUND

Additive manufacturing systems may be utilized to "build" an object from build material, such as organic or inorganic powders, in a layer-wise manner. Conventional additive manufacturing systems include various "recoat" apparatuses within a build housing that are configured to sequentially distribute layers of build material, such that an energy source can fuse the build material to "build" an object.

SUMMARY

During the additive manufacturing process, condensate byproducts may be formed as the build material is fused together. As one example, in some instances, metal build material may be fused by direct metal laser melting (DMLM), and fine metal condensates may be formed as the metal build material is fused together. To reduce contamination of these fine metal condensates within the build material and/or the object being formed, these fine metal condensates may be removed from the build housing via a filtration system. In these configurations, the fine metal condensates may be collected by passing gases from within the build housing through a filter that collects airborne fine metal condensates.

Over time, the filters may need to be replaced with new filters. However, the fine metal condensates collected on the filters may be highly reactive, and may be prone to combustion upon exposure to oxygen in ambient air. To passivate the fine metal condensates, the filters and the fine metal condensates on the filters may be wetted (e.g., submerged or at least partially submerged) within a passivation fluid, such as water, before being removed from a filter housing. However, in these configurations, it is difficult and time consuming to ensure that the filters are sufficiently wetted before being removed from the filter housing. Accordingly, a need exists for improved methods for wetting filters used in additive manufacturing processes.

In one embodiment, a method for wetting volatile material positioned on a filter from an additive manufacturing process includes passing a passivation fluid to an interior space of a filtration system including an outer housing, a filtration medium structurally configured to filter gas passed from a dirty side of the filtration medium to a clean side of the filtration medium, where the interior space is defined at least in part by the outer housing and the dirty side of the filtration medium, detecting an amount of passivation fluid passed to the interior space with a volume detection device, determining whether the amount of passivation fluid passed to the interior space is less than a configurable threshold, in response to determining that the amount of passivation fluid passed to the interior space is less than the configurable threshold, continuing to pass the passivation fluid to the interior space, and in response to determining that the amount of passivation fluid passed to the interior space is not less than the configurable threshold, stopping the passing of passivation fluid to the interior space.

In another embodiment, a method for forming a three-dimensional product includes dispensing a powdered build material, forming a three-dimensional product with the powdered build material, passing a condensate formed from the powdered build material to a filtration system, the filtration system including a filtration medium including a dirty side positioned opposite a clean side, and a where the filtration system defines an interior space positioned between an outer housing and the dirty side of the filtration medium, passing a passivation fluid to the interior space, detecting an amount of the passivation fluid passed to the interior space with a volume detection device, determining, with a controller communicatively coupled to the volume detection device, whether the amount of the passivation fluid passed to the interior space is less than a configurable threshold, in response to determining that the amount of the passivation fluid passed to the interior space is less than the configurable threshold, continuing to pass the passivation fluid to the interior space, and in response to determining that the amount of passivation fluid passed to the interior space is not less than the configurable threshold, stopping the passing of passivation fluid to the interior space.

In yet another embodiment, a system for wetting volatile material from an additive manufacturing process positioned on a filter includes a filtration system including an outer housing, a filtration medium structurally configured to filter gas passed from a dirty side of the filtration medium to a clean side of the filtration medium, and an interior space defined at least in part by the outer housing and the dirty side of the filtration medium, a filling device including a filling inlet selectively coupled to a passivation source, a filling outlet selectively coupled to the outer housing of the filtration system, a valve positioned between the filling inlet and the filling outlet, where the valve is positionable between an open position, in which passivation fluid can flow from the filling inlet to the filling outlet, and a closed position, in which flow of the passivation fluid from the filling inlet to the filling outlet is restricted, a volume detection device that detects at least one of a volume and a flow rate of the passivation fluid passing through the filling device, a controller communicatively coupled to the valve and the volume detection device, the controller including a processor and a computer readable and executable instruction set, which when executed, causes the processor to receive a signal from the volume detection device indicative of an amount of the passivation fluid passed to the interior space, determine whether the amount of the passivation fluid passed to the interior space is less than a configurable threshold, in response to determining that the amount of the passivation fluid passed to the interior space is less than the configurable threshold, direct the valve to remain in the open position to pass the passivation fluid to the interior space, and in response to determining that the amount of the passivation fluid passed to the interior space is not less than the configurable threshold, direct the valve to move to the closed position to stop the passing of passivation fluid to the interior space.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3A schematically depicts a perspective view of the filtration system of FIG. 2 with a lid removed, according to one or more embodiments shown and described herein;

FIG. 3B schematically depicts a perspective view of the filtration system of FIG. 3A with a pair of filtration media at least partially removed, according to one or more embodiments shown and described herein;

DETAILED DESCRIPTION

Figure 1:
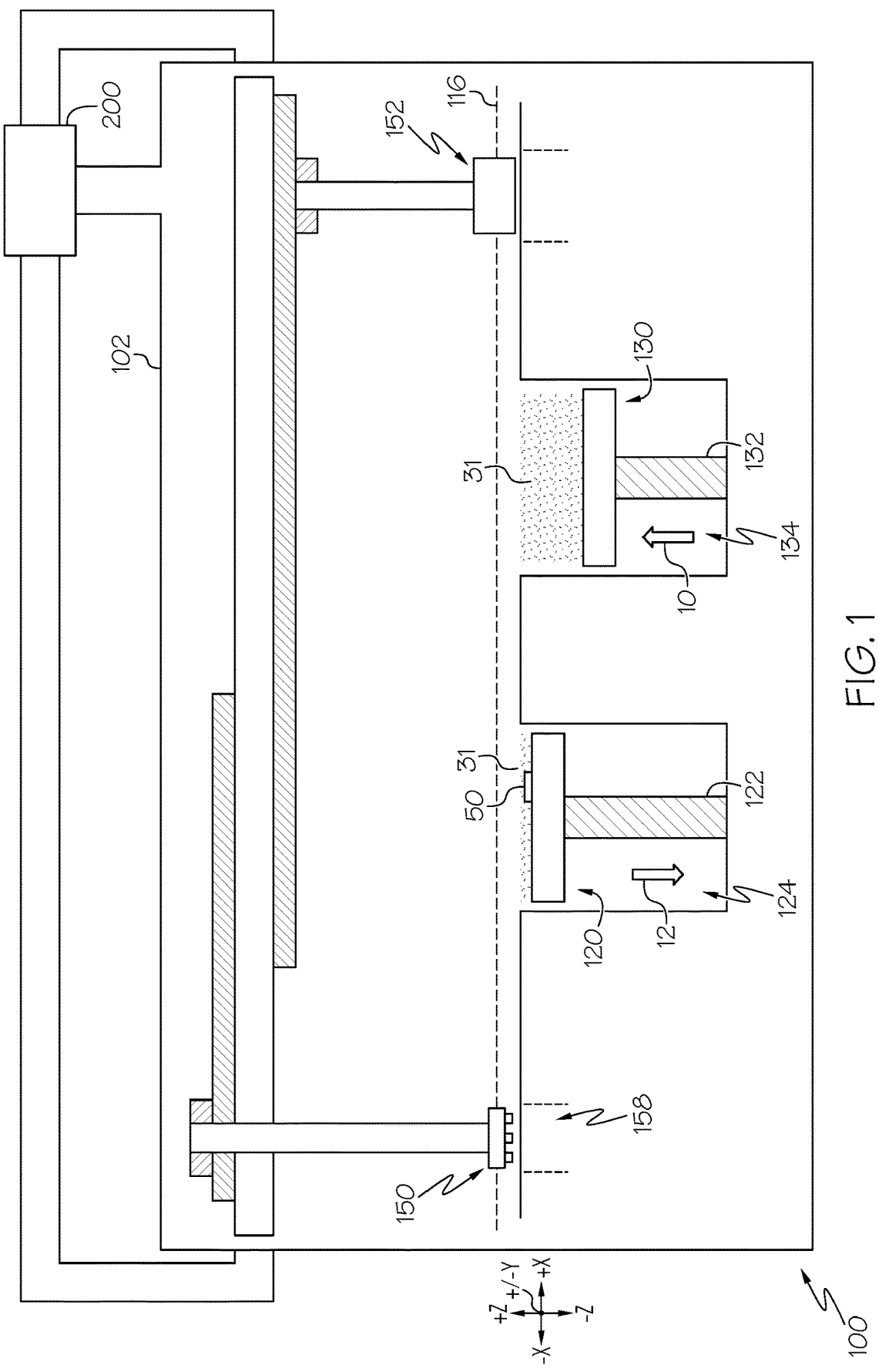
FIG. 1 schematically depicts an additive manufacturing system, according to one or more embodiments shown and described herein.

Reference will now be made in detail to embodiments of additive manufacturing apparatuses and filling devices, and components thereof, examples of which are illustrated in the accompanying drawings. Whenever possible, the same reference numerals will be used throughout the drawings to refer to the same or like parts. Filling devices according to the present application generally pass passivation fluid to wet volatile material positioned on a filtration medium used in an additive manufacturing process. The filling devices may pass the passivation fluid to a dirty side of the filtration medium, such that the passivation fluid does not necessarily have to pass through the filtration medium to wet the volatile material on the dirty side of the filtration medium. In some embodiments, the filling devices may automatically stop passing the passivation fluid to the filtration medium upon determining that an amount of passivation fluid passed to the filtration medium is above a configurable threshold. In this way, the volatile material can be wetted without requiring a user to actively monitor the amount of passivation fluid passed to the filtration medium. Further, as compared to manual processes, automatically controlling the amount of the passivation fluid passed to the filtration medium may reduce variation in the amount of passivation fluid passed to the filtration medium, thereby assisting in ensuring that the volatile material on the filtration medium is fully wetted before removal from a filtration system. These and other embodiments of filling devices and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

The phrase "communicatively coupled" is used herein to describe the interconnectivity of various components and means that the components are connected either through wires, optical fibers, or wirelessly such that electrical, optical, and/or electromagnetic signals may be exchanged between the components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an example additive manufacturing system 100 is schematically depicted. The additive manufacturing system 100 includes a supply platform 130, a build platform 120, and a recoat assembly 152. The supply platform 130 is coupled to a supply platform actuator 132. The supply platform actuator 132 is movable in the vertical direction (i.e., the +/−Z direction of the coordinate axes depicted in the figure) such that the supply platform 130 may be raised or lowered within a supply receptacle 134. The build platform 120 is located adjacent to the supply platform 130 and, like the supply platform 130, is coupled to a build platform actuator 122. The build platform actuator 122 is movable in the vertical direction such that the build platform 120 may be raised or lowered (i.e., the +/−Z direction of the coordinate axes depicted in the figure) within a build receptacle 124.

In operation, build material 31, such as organic or inorganic powder, is positioned on the supply platform 130. The supply platform 130 is actuated to present a layer of the build material 31 in the path of the recoat assembly 152. The recoat assembly 152 is then actuated along a working axis 116 of the additive manufacturing system 100 towards the build platform 120. As the recoat assembly 152 traverses the working axis 116 over the supply platform 130 towards the build platform 120, the recoat assembly 152 dispenses the layer of build material 31 in the path of the recoat assembly 152 from the supply platform 130 to the build platform 120.

Thereafter, a heating assembly 150 moves along the working axis 116 over the build platform 120 and may apply energy to fuse the build material 31, thereby forming a fused product 50. In some embodiments, the heating assembly 150 may include a laser or the like to apply energy to the build material 31. The heating assembly 150 can then move to a home position 158.

The supply platform 130 may then be actuated in an upward vertical direction (i.e., in the +Z direction of the coordinate axes depicted in the figure) as indicated by arrow 10 to present a new layer of build material 31 in the path of the recoat assembly 152. The build platform 120 is actuated in the downward vertical direction (i.e., in the −Z direction of the coordinate axes depicted in the figure) as indicated by arrow 12 to prepare the build platform 120 to receive a new layer of build material 31 from the supply platform 130. The recoat assembly 152 is then actuated along the working axis 116 of the additive manufacturing system 100 again to add another layer of build material 31 and fused product 50 to the build platform 120. This sequence of steps is repeated multiple times to build a three-dimensional product on the build platform 120 in a layer-wise manner.

While the embodiment depicted in FIG. 1 and described above describes the recoat assembly 152 and the heating assembly 150 as being different components, it should be understood that recoat assembly 152 and the heating assembly 150 may be included in a common assembly that is movable along the working axis 116. Further, while in the embodiment depicted in FIG. 1, build material 31 is supplied via the supply platform 130, it should be understood that this is merely an example, and build material 31 can be supplied to the build receptacle from a hopper or the like. Further, while in the embodiment depicted in FIG. 1, the heating assembly 150 is depicted and described as being movable along the working axis 116, it should be understood that this is merely an example, and the heating assembly 150 may be movable in any suitable direction and may be stationary in some embodiments.

In embodiments, at least a portion of the additive manufacturing system 100 may be positioned within a build housing 102. In some embodiments, the build housing 102 may hermetically or non-hermetically seal at least a portion of the additive manufacturing system 100, and gas may be positioned within the build housing 102. In some embodiments, the gas positioned within the build housing 102 may restrict combustion within the build housing 102, and may include one or more inert gases.

As build material 31 is fused to form the fused product 50, condensates may be formed, and in some instances, the condensates may be airborne within the build housing 102. In the embodiment depicted in FIG. 1, the additive manufacturing system 100 includes a filtration system 200 in communication with the build housing 102. The filtration system 200, in embodiments, may draw gases out of the build housing 102 and may filter the gases, as described in greater detail herein.

Figure 2:
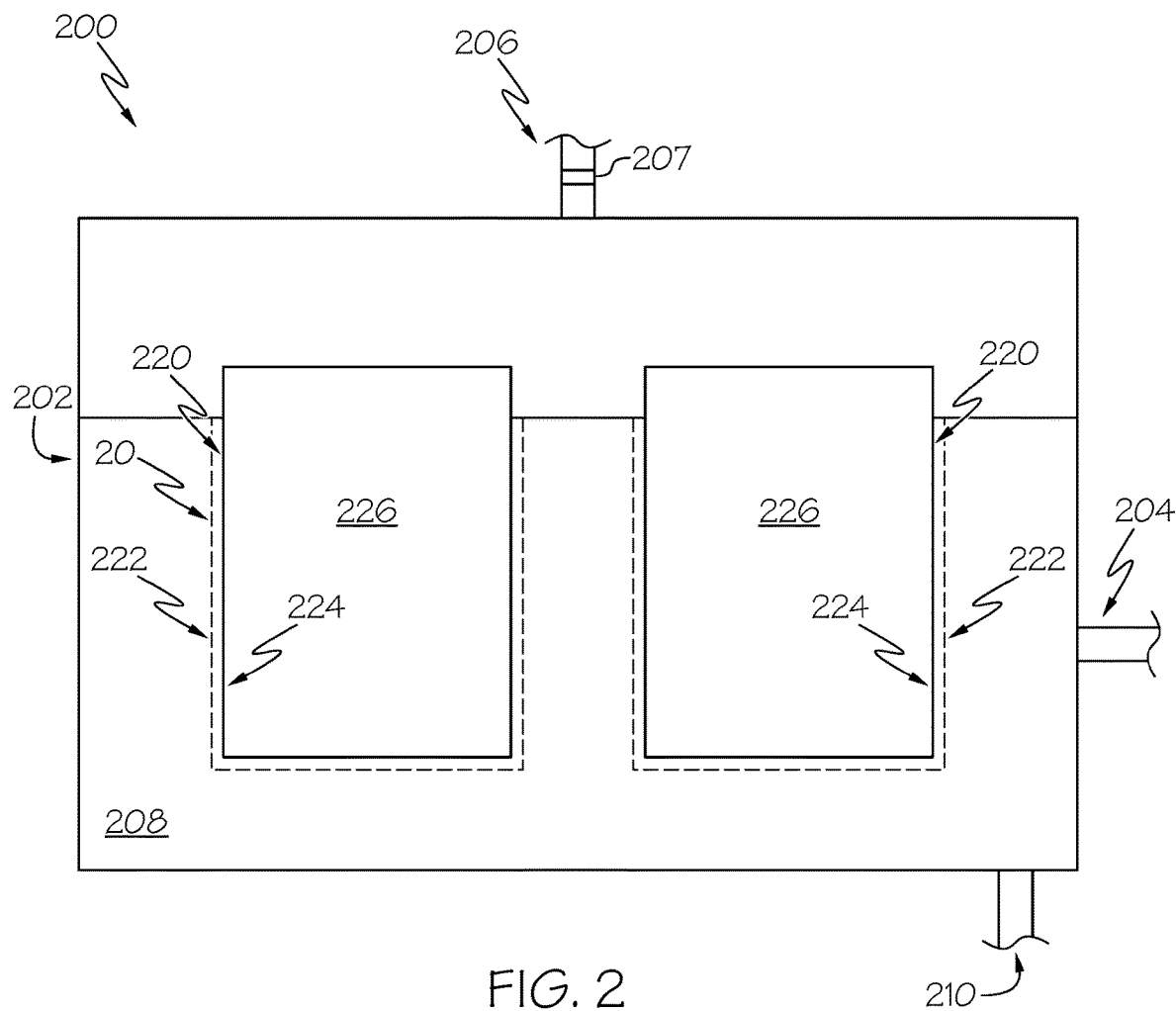
FIG. 2 schematically depicts a section view of a filtration system according to one or more embodiments shown and described herein.

Referring to FIG. 2, a section view of the filtration system 200 is schematically depicted. In embodiments, the filtration system 200 generally includes an outer housing 202, a housing inlet 204, and one or more housing outlets 206. In embodiments, the gases from the build housing 102 (FIG. 1) may pass through the housing inlet 204 into the outer housing 202, and may pass out of the outer housing 202 through the one or more housing outlets 206. While in the embodiment depicted in FIG. 2 the housing inlet 204 and the one or more housing outlets 206 are depicted as being on particular surfaces of the outer housing 202, it should be understood that this is merely an example. In embodiments, the housing inlet 204 and the one or more housing outlets 206 may be positioned at any suitable location on the outer housing 202, and the housing inlet 204 and the one or more housing outlets 206 may be positioned on the same or different surfaces of the outer housing 202.

Referring to FIGS. 2, 3A, and 3B, perspective views of the filtration system 200 are schematically depicted. In embodiments, the filtration system 200 generally includes one or more filtration media 220 positioned at least partially within the outer housing 202. In embodiments, the one or more filtration mediums 220 are structurally configured to filter gas passed from a dirty side 222 of the filtration mediums 220 to a clean side 224 of the filtration mediums 220.

As gas passes into the outer housing 202 via the housing inlet 204, and from the dirty side 222 of the filtration mediums 220 to the clean side 224 of the filtration mediums 220, volatile material, such as condensate 20, is deposited on the dirty side 222 of the filtration mediums 220.

After passing from the dirty side 222 of the filtration mediums 220 to the clean side 224 of the filtration mediums 220, the gas moves to inner chambers 226 of the filtration mediums 220. The inner chambers 226 of the filtration mediums 220 are in communication with the one or more housing outlets 206, and gas within the inner chambers 226 of the filtration mediums 220 may exit the filtration system 200 through the housing outlets 206. In some embodiments, filtered gas from the filtration system 200 may be recycled to the build housing 102 (FIG. 1). In some embodiments, filtered gas from the filtration system 200 may be stored and/or released to the atmosphere. While in the embodiment depicted in FIG. 2 the filtration system 200 includes a single housing outlet 206, it should be understood that this is merely an example, and embodiments described herein may include any suitable number of housing outlets 206. Further, in some embodiments, an outlet filter 207 may be positioned between the filtration mediums 220 and the one or more housing outlets 206. The outlet filter 207 may include a high-efficiency particulate air (HEPA) filter configured to filter gas exiting the filtration system 200 via the one or more housing outlets 206.

While in the embodiment depicted in FIGS. 2, 3A, and 3B, the filtration mediums 220 are cylindrically-shaped with the dirty sides 222 positioned on an outer perimeter of the filtration mediums 220 and the clean sides 224 on an inner perimeter of the filtration mediums 220, it should be understood that this is merely an example. In embodiments according to the present disclosure, the filtration mediums may include any suitable shape for filtering the condensate 20 from a gas passing from a dirty side of the filtration medium to a clean side of the filtration medium. Further, while in the embodiment depicted in FIGS. 2, 3A, and 3B the filtration system 200 includes two filtration mediums 220, it should be understood that filtration system 200 according to the present disclosure may include any suitable number of filtration mediums 220.

Over time, as condensate 20 accumulates on the dirty sides 222 of the filtration mediums 220, the filtration mediums 220 may be removed and replaced with new filtration mediums 220. In embodiments, the condensate 20 may be volatile and may be prone to spontaneous combustion upon exposure to oxygen in ambient air. For example, as the filtration mediums 220 are removed from the outer housing 202, the condensate 20 accumulated on the dirty sides 222 of the filtration mediums 220 may be exposed to oxygen in ambient air, which can lead to combustion of the condensate 20. In embodiments according to the present disclosure, the filtration mediums 220 may be wetted with a passivation fluid, such as water, before being removed from the outer housing 202. By wetting the filtration mediums 220, volatile material (e.g., the condensate 20) may be passivated, thereby reducing the likelihood of combustion of the volatile material.

Figure 4:
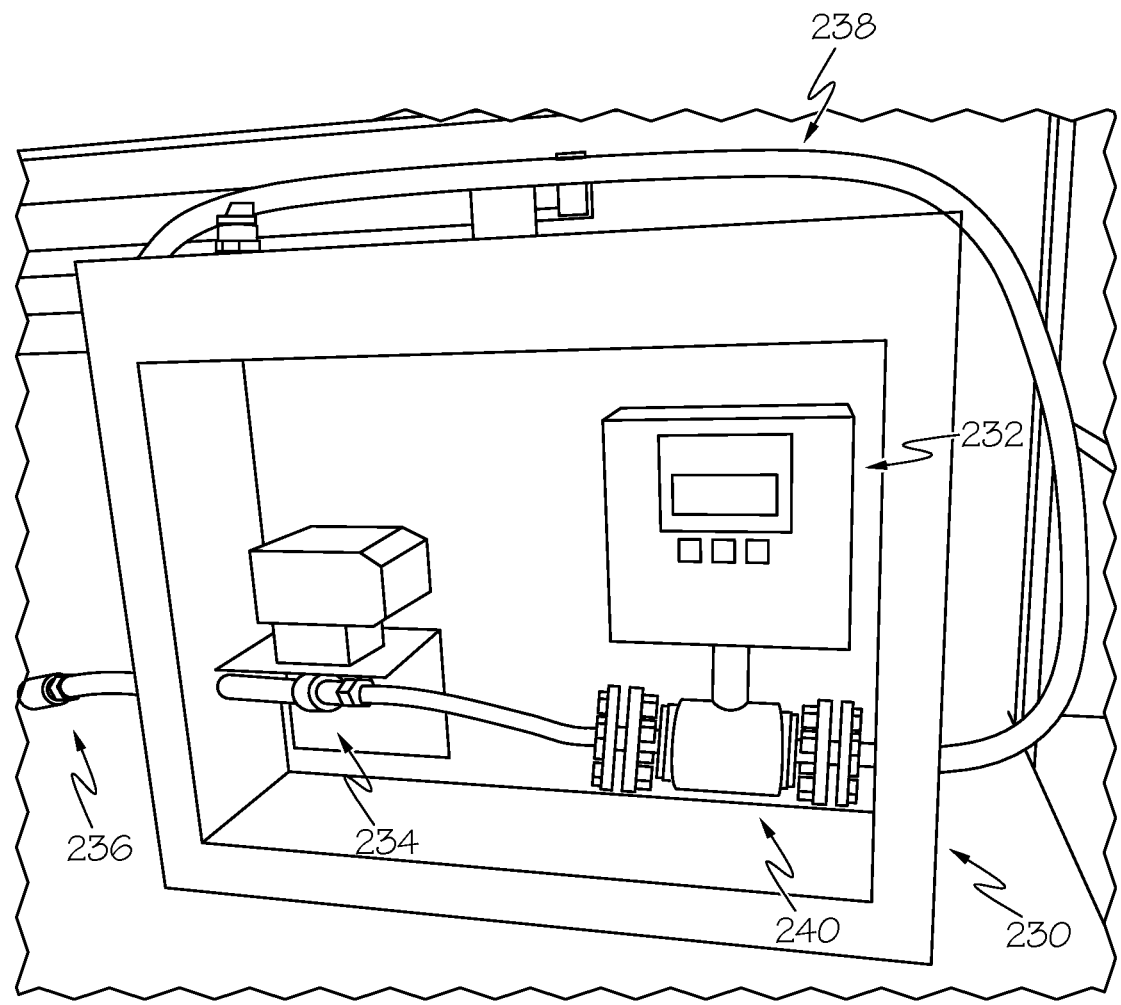
FIG. 4 schematically depicts a perspective view of a filling device, according to one or more embodiments shown and described herein.

Referring to FIGS. 2 and 4, a perspective view of a filling device 230 is schematically depicted. In embodiments, the filling device 230 includes a filling inlet 236 and a filling outlet 238. Passivation fluid, such as water, may pass through the filling device 230 from the filling inlet 236 to the filling outlet 238. In some embodiments, the filling inlet 236 may be selectively coupled to a passivation source, such as a water tap or the like, and the filling outlet 238 may be selectively coupled to the outer housing 202 of the filtration system 200. By allowing the filling device 230 to be coupled to a common water tap, the filling device 230 may be utilized in a variety of applications without requiring access to specialized sources of passivation fluid. For example in some embodiments, the filling outlet 238 may be selectively coupled to the housing inlet 204 of the outer housing 202. In some embodiments, the filling outlet 238 may be selectively coupled to a fluid inlet 210 of the outer housing 202. While in the embodiment depicted in FIG. 2 the fluid inlet 210 is positioned at a lower portion of the outer housing 202, it should be understood that the fluid inlet 210 may be at any suitable location exterior to the dirty sides 222 of the filtration mediums 220.

The filling device 230 further includes a valve 234 and a controller 232 communicatively coupled to the valve 234. In embodiments, the valve 234 is positionable between an open position, in which passivation fluid (e.g., water) can flow from the filling inlet 236 to the filling outlet 238, and a closed position, in which flow of the passivation fluid (e.g., water) from the filling inlet 236 to the filling outlet 238 is restricted.

In some embodiments, the filling device 230 may further include a volume detection device 240 that is structurally configured to detect a volume and/or flow rate of passivation fluid passing through the filling device 230. The volume detection device 240 may include any device for detecting a volume and/or a flow rate of fluid passing through the filling device 230, such as a flowmeter or the like.

Figure 5:
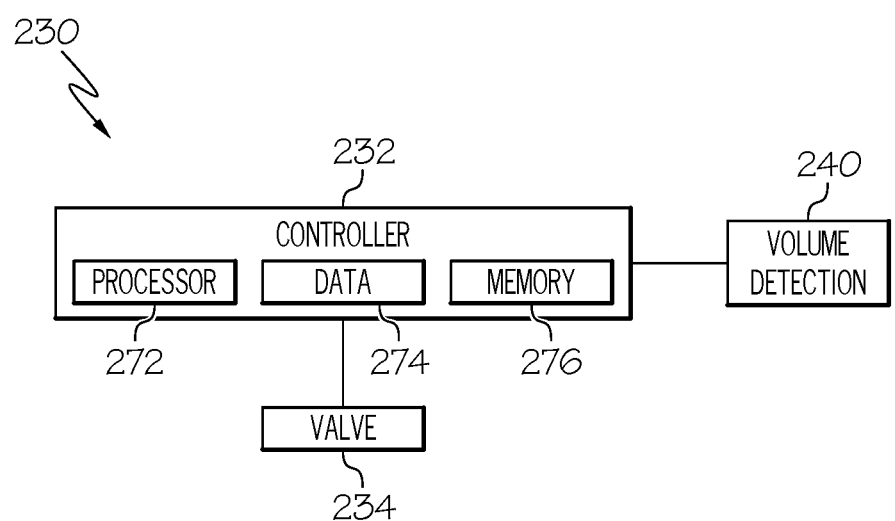
FIG. 5 schematically depicts a control diagram of the filling device, according to one or more embodiments shown and described herein.

Referring to FIG. 5, a control diagram of the filling device 230 is schematically depicted. The filling device 230 generally includes the controller 232 communicatively coupled to the valve 234. The controller 232, in embodiments, generally includes a processor 272, a data storage component 274, and/or a memory component 276. The memory component 276 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 232 and/or external to the controller 232.

The memory component 276 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface may also be included in the controller 232, and may be implemented as a bus or other communication interface to facilitate communication among the components of the controller 232.

The processor 272 may include any processing component operable to receive and execute instructions (such as from a data storage component 274 and/or the memory component 276). It should be understood that while the components in FIG. 5 are illustrated as residing within the controller 232, this is merely an example, and in some embodiments, one or more of the components may reside external to the controller 232. It should also be understood that, while the controller 232 is illustrated as a single device, this is also merely an example.

In embodiments, the controller 232 is communicatively coupled to one or more components of the filling device 230. For example, in the embodiment depicted in FIG. 5, the controller 232 is communicatively coupled to the valve 234. In embodiments, the valve 234 may send and/or receive signals from the controller 232. For example, the controller 232 may send signals to the valve 234 directing the valve 234 to move between the open and the closed position to control the flow of passivation fluid (e.g., water) through the filling device 230 to the outer housing 202 (FIG. 2).

In some embodiments, the filling device 230 further includes the volume detection device 240 communicatively coupled to the controller 232. In embodiments, the volume detection device 240 may send signals to the controller 232 indicative of a volume and/or a flow rate of passivation fluid (e.g., water) passing through the filling device 230.

Figure 6:
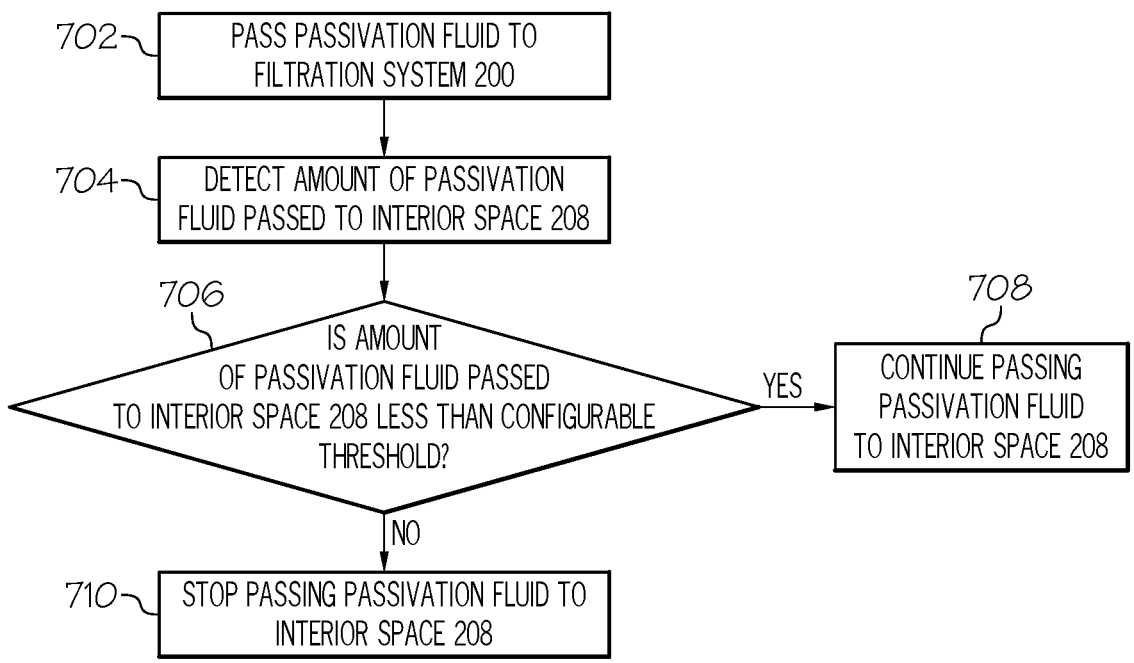
FIG. 6 depicts a flowchart of an example method for operating the filling device of FIG. 6, according to one or more embodiments shown and described herein.
Figure 7:
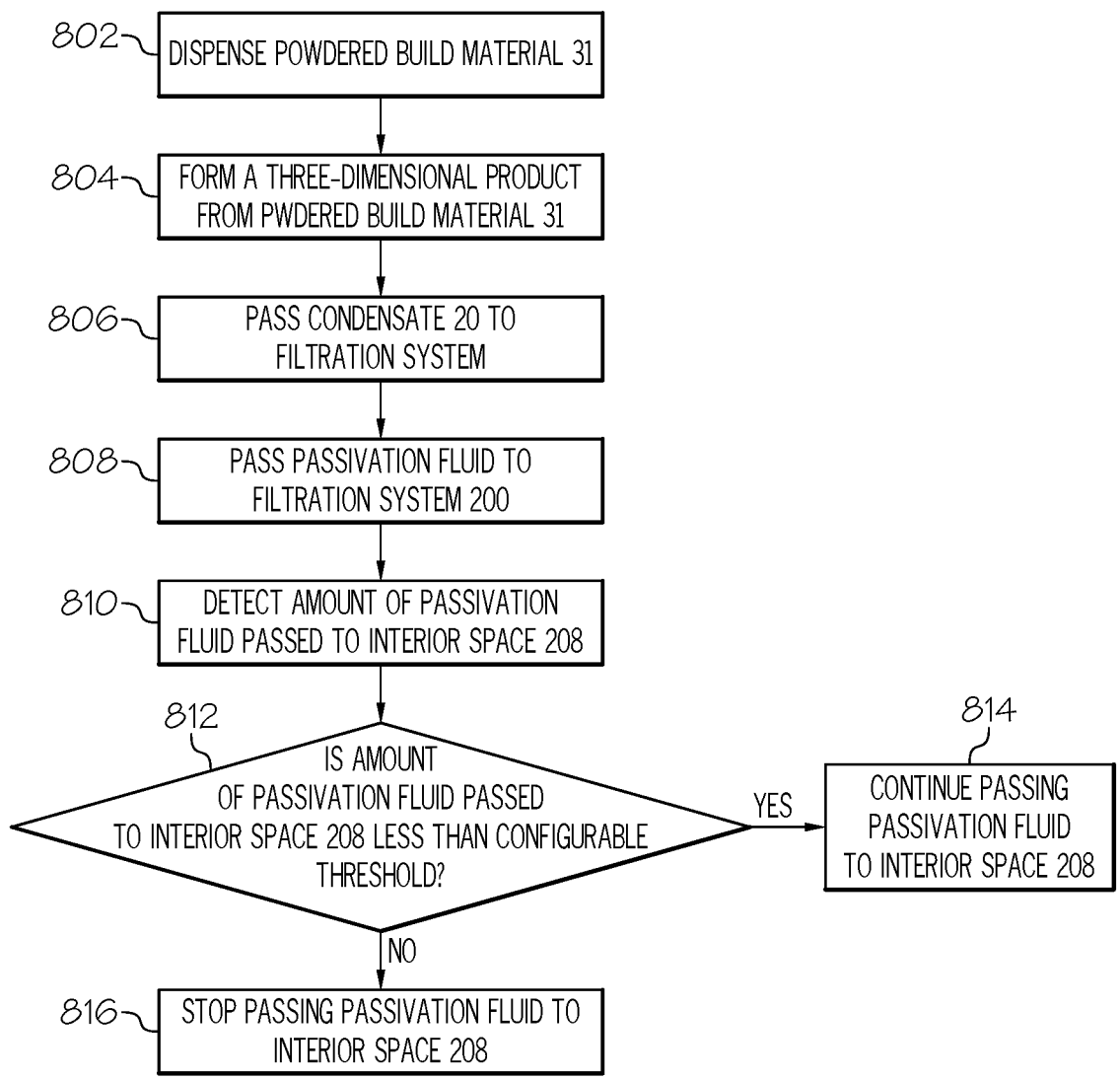
FIG. 7 depicts a flowchart of an example method for operating the additive manufacturing system of FIG. 1 and the filling device of FIG. 5, according to one or more embodiments shown and described herein.

Referring to FIGS. 2, 5, and 6, a flowchart of one method for operating the filling device 230 is depicted. In a first block 702, passivation fluid (e.g., water) is passed to the interior space 208 defined at least in part by the outer housing 202 and the dirty side 222 of the filtration medium 220. At block 704, an amount of passivation fluid passed to the interior space 208 is detected. For example, in embodiments, the amount of passivation fluid passed to the interior space 208 is associated with the amount of passivation fluid passed through the filling device 230 (e.g., from the filling inlet 236 to the filling outlet 238). At block 706, the controller 232 determines whether the amount of passivation fluid passed to the interior space 208 is less than a configurable threshold. In response to determining that the amount of passivation fluid passed to the interior space 208 is less than the configurable threshold, at block 708, the filling device 230 continues to pass passivation fluid to the interior space 208. For example, in embodiments, the controller 232 may direct the valve 234 to remain in the open position such that the filling device 230 continues to pass passivation fluid to the interior space 208. In response to determining that the amount of passivation fluid passed to the interior space 208 is not less than the configurable threshold, at block 710, the filling device 230 stops the passing of passivation fluid to the interior space 208. For example, in embodiments, the controller 232 directs the valve 234 to move to the closed position, such that passivation fluid no longer flows from the filling device 230 to the interior space 208. In some embodiments, subsequent to stopping the passing of passivation fluid to the interior space 208, the filtration medium 220 can be removed from the outer housing 202.

In embodiments, the configurable threshold is associated with an amount of passivation fluid to wet volatile material (e.g., the condensate 20) positioned on the dirty side 222 of the filtration medium 220. For example, in some embodiments, the configurable threshold may be associated with an amount of passivation fluid that fills the interior space 208. In some embodiments, the configurable threshold may be associated with an amount of passivation fluid that fills the interior space 208 and the inner chambers 226 defined by the filtration mediums 220.

In embodiments, by automatically determining whether the amount of passivation fluid is less than the configurable threshold with the controller 232 and the volume detection device 240, the filling device 230 may reduce the likelihood that the filtration mediums 220 are removed from the outer housing 202 with dry condensate 20 positioned on the filtration mediums 220. Further, by passing passivation fluid (e.g., water) to the dirty side 222 of the filtration mediums 220, the condensate 20 positioned on the dirty side 222 of the filtration mediums 220 may be wetted without requiring that the passivation fluid passes through the filtration mediums 220, thereby reducing the amount of time required to wet the filtration mediums 220. For example, in some configurations, passivation fluid (e.g., water) may be passed to the interior space 208 from the clean side 224 of the filtration mediums 220, and the passivation fluid may flow from the clean side 224 of the filtration mediums 220 to the dirty side of the filtration mediums 220. However, flow of the passivation fluid from the clean side 224 of the filtration mediums 220 to the dirty side 222 of the filtration mediums 220 may be restricted, for example by the filtration mediums 220 and the condensate 20 positioned on the dirty side 222 of the filtration mediums 220. Accordingly, by passing passivation fluid to the dirty side 222 of the filtration mediums 220, the condensate 20 on the dirty side 222 of the filtration mediums 220 may be wetted without necessarily passing the passivation fluid through the filtration mediums 220. In this way, the amount of time required to wet the condensate 20 may be reduced as compared to configurations in which the passivation fluid is passed through the filtration mediums 220.

In some embodiments, gases within the outer housing 202 may be vented to an exterior location, for example as the passivation fluid is passed into the interior space 208. As one example, the filtration system 200 may be positioned within a structure such as a building, and gases within the outer housing 202 may be vented to a location exterior to the building as the passivation fluid is passed into the interior space 208. Without being bound by theory, gases may be formed as byproducts of reactive metals, such as titanium or aluminum, being mixed with the passivation fluid. Build material 31 (FIG. 1) may include one or more of these reactive metals, and the reactive metals can be carried into the filtration system 200 and generate gaseous byproducts, such as oxyhydrogen, and these gaseous byproducts may be vented to the exterior location.

Referring to FIGS. 1, 2, 5, and 7, a flowchart for operating the additive manufacturing system 100 is depicted. In a first block 802, powdered build material 31 is dispensed, for example to the build receptacle 124 by the recoat assembly 152. At block 804, a three-dimensional product is formed from the build material 31, for example by forming fused product 50. At block 806, condensate 20 formed from the powdered build material 31 and/or the fused build material 50 is passed to the filtration system 200. At block 808 passivation fluid (e.g., water) is passed to the interior space 208 defined at least in part by the outer housing 202 and the dirty side 222 of the filtration medium 220. As described above, in some embodiments, the passivation fluid may pass through the filtration medium 220 to the interior chamber 226. At block 810, an amount of passivation fluid passed to the interior space 208 is detected. For example, in embodiments, the amount of passivation fluid passed to the interior space 208 is associated with the amount of passivation fluid passed through the filling device 230 (e.g., from the filling inlet 236 to the filling outlet 238). At block 812, the controller 232 determines whether the amount of passivation fluid passed to the interior space 208 is less than a configurable threshold. In response to determining that the amount of passivation fluid passed to the interior space 208 is less than the configurable threshold, at block 814, the filling device 230 continues to pass passivation fluid to the interior space 208. For example, in embodiments, the controller 232 may direct the valve 234 to remain in the open position such that the filling device 230 continues to pass passivation fluid to the interior space 208. In response to determining that the amount of passivation fluid passed to the interior space 208 is not less than the configurable threshold, at block 816, the filling device 230 stops the passing of passivation fluid to the interior space 208. For example, in embodiments, the controller 232 directs the valve 234 to move to the closed position, such that passivation fluid no longer flows from the filling device 230 to the interior space 208.

Based on the foregoing, it should be understood that embodiments described herein are directed to filling devices that pass passivation fluid to wet a volatile material positioned on a filtration medium used in an additive manufacturing process. The filling devices may pass the passivation fluid to a dirty side of the filtration medium, such that the passivation fluid does not necessarily have to pass through the filtration medium to wet the volatile material on the dirty side of the filtration medium. In some embodiments, the filling devices may automatically stop passing the passivation fluid to the filtration medium upon determining that an amount of passivation fluid passed to the filtration medium is above a configurable threshold. In this way, the volatile material can be wetted without requiring a user to actively monitor the amount of passivation fluid passed to the filtration medium. Further, as compared to manual processes, automatically controlling the amount of the passivation fluid passed to the filtration medium may reduce variation in the amount of passivation fluid passed to the filtration medium, thereby assisting in ensuring that the volatile material on the filtration medium is fully wetted before removal from a filtration system.

Further aspects of the invention are provided by the subject matter of the following clauses:

In a first aspect A1, the present disclosure provides a method for wetting volatile material positioned on a filter from an additive manufacturing process, the method comprising passing a passivation fluid to an interior space of a filtration system comprising an outer housing, a filtration medium structurally configured to filter gas passed from a dirty side of the filtration medium to a clean side of the filtration medium, wherein the interior space is defined at least in part by the outer housing and the dirty side of the filtration medium, detecting an amount of passivation fluid passed to the interior space with a volume detection device, determining whether the amount of passivation fluid passed to the interior space is less than a configurable threshold, in response to determining that the amount of passivation fluid passed to the interior space is less than the configurable threshold, continuing to pass the passivation fluid to the interior space, and in response to determining that the amount of passivation fluid passed to the interior space is not less than the configurable threshold, stopping the passing of passivation fluid to the interior space.

In a second aspect A2, the present disclosure provides the method of any preceding clause, wherein continuing to pass the passivation fluid to the interior space comprises maintaining a valve in communication with the interior space in an open position.

In a third aspect A3, the present disclosure provides the method of any preceding clause, wherein stopping the passing of passivation fluid to the interior space comprises moving a valve in communication with the interior space into a closed position.

In a fourth aspect A4, the present disclosure provides the method of any preceding clause, wherein the configurable threshold is associated with an amount of passivation fluid to wet volatile material positioned on the dirty side of the filtration medium.

In a fifth aspect A5, the present disclosure provides the method of any preceding clause, further comprising venting a gas from the filtration system to a location exterior to a building.

In a sixth aspect A6, the present disclosure provides the method of any preceding clause, wherein the passivation fluid comprises water.

In a seventh aspect A7, the present disclosure provides the method of any preceding clause, wherein the dirty side of the filtration medium comprises a volatile powder.

In an eighth aspect A8, the present disclosure provides the method of any preceding clause, wherein the dirty side of the filtration medium comprises a volatile powder, continuing to pass the passivation fluid to the interior space comprises maintaining a valve in communication with the interior space in an open position, stopping the passing of the passivation fluid to the interior space comprises moving the valve in communication with the interior space into a closed position, and the configurable threshold is associated with an amount of the passivation fluid to wet volatile material positioned on the dirty side of the filtration medium.

In a ninth aspect A9, the present disclosure provides the method of any preceding clause, wherein the filtration medium is cylindrically-shaped and wherein the dirty side is positioned on an outer perimeter of the filtration medium.

In a tenth aspect A10, the present disclosure provides a method for forming a three-dimensional product, the method comprising dispensing a powdered build material, forming a three-dimensional product with the powdered build material, passing a condensate formed from the powdered build material to a filtration system, the filtration system comprising a filtration medium comprising a dirty side positioned opposite a clean side, and a wherein the filtration system defines an interior space positioned between an outer housing and the dirty side of the filtration medium, passing a passivation fluid to the interior space, detecting an amount of the passivation fluid passed to the interior space with a volume detection device, determining, with a controller communicatively coupled to the volume detection device, whether the amount of the passivation fluid passed to the interior space is less than a configurable threshold, in response to determining that the amount of the passivation fluid passed to the interior space is less than the configurable threshold, continuing to pass the passivation fluid to the interior space, and in response to determining that the amount of passivation fluid passed to the interior space is not less than the configurable threshold, stopping the passing of passivation fluid to the interior space.

In an eleventh aspect A11, the present disclosure provides the method of any preceding clause, wherein continuing to pass the passivation fluid to the interior space comprises maintaining a valve in communication with the interior space in an open position.

In a twelfth aspect A12, the present disclosure provides the method of any preceding clause, wherein stopping the passing of passivation fluid to the interior space comprises moving a valve in communication with the interior space into a closed position.

In a thirteenth aspect A13, the present disclosure provides the method of any preceding clause, wherein the configurable threshold is associated with an amount of passivation fluid to wet volatile material positioned on the dirty side of the filtration medium.

In a fourteenth aspect A14, the present disclosure provides the method of any preceding clause, further comprising venting a gas from the filtration system to a location exterior to a building.

In a fifteenth aspect A15, the present disclosure provides the method of any preceding clause, further comprising, subsequent to stopping the passing of passivation fluid to the interior space, removing the filtration medium from the outer housing.

In a sixteenth aspect A16, the present disclosure provides the method of any preceding clause, wherein the filtration medium is a first filtration medium, and wherein the method further comprises positioning a second filtration medium in the outer housing.

In a seventeenth aspect A17, the present disclosure provides a system for wetting volatile material from an additive manufacturing process positioned on a filter, the system comprising a filtration system comprising an outer housing, a filtration medium structurally configured to filter gas passed from a dirty side of the filtration medium to a clean side of the filtration medium, and an interior space defined at least in part by the outer housing and the dirty side of the filtration medium, a filling device comprising a filling inlet selectively coupled to a passivation source, a filling outlet selectively coupled to the outer housing of the filtration system, a valve positioned between the filling inlet and the filling outlet, wherein the valve is positionable between an open position, in which passivation fluid can flow from the filling inlet to the filling outlet, and a closed position, in which flow of the passivation fluid from the filling inlet to the filling outlet is restricted, a volume detection device that detects at least one of a volume and a flow rate of the passivation fluid passing through the filling device, a controller communicatively coupled to the valve and the volume detection device, the controller comprising a processor and a computer readable and executable instruction set, which when executed, causes the processor to receive a signal from the volume detection device indicative of an amount of the passivation fluid passed to the interior space, determine whether the amount of the passivation fluid passed to the interior space is less than a configurable threshold, in response to determining that the amount of the passivation fluid passed to the interior space is less than the configurable threshold, direct the valve to remain in the open position to pass the passivation fluid to the interior space, and in response to determining that the amount of the passivation fluid passed to the interior space is not less than the configurable threshold, direct the valve to move to the closed position to stop the passing of passivation fluid to the interior space.

In an eighteenth aspect A18, the present disclosure provides the system of any preceding clause, wherein the configurable threshold is associated with an amount of the passivation fluid to wet volatile material positioned on the dirty side of the filtration medium.

In a nineteenth aspect A19, the present disclosure provides the system of any preceding clause, wherein the passivation fluid comprises water.

In a twentieth aspect A20, the present disclosure provides the system of any preceding clause, wherein the filtration medium is cylindrically-shaped and wherein the dirty side is positioned on an outer perimeter of the filtration medium.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for wetting volatile material positioned on a filter from an additive manufacturing process, the method comprising:
    passing a passivation fluid to an interior space of a filtration system comprising an outer housing, a filtration medium structurally configured to filter gas passed from a dirty side of the filtration medium to a clean side of the filtration medium, wherein the interior space is defined at least in part by the outer housing and the dirty side of the filtration medium;
    detecting an amount of passivation fluid passed to the interior space with a volume detection device;
    determining whether the amount of passivation fluid passed to the interior space is less than a configurable threshold;
    in response to determining that the amount of passivation fluid passed to the interior space is less than the configurable threshold, continuing to pass the passivation fluid to the interior space; and
    in response to determining that the amount of passivation fluid passed to the interior space is not less than the configurable threshold, stopping the passing of passivation fluid to the interior space,
    wherein the configurable threshold is determined by an amount of passivation fluid to fill the interior space and an inner chamber volume defined by the filtration medium.

2. The method of claim 1, wherein continuing to pass the passivation fluid to the interior space comprises maintaining a valve in communication with the interior space in an open position.

3. The method of claim 1, wherein stopping the passing of passivation fluid to the interior space comprises moving a valve in communication with the interior space into a closed position.

4. The method of claim 1, further comprising venting a gas from the filtration system to a location exterior to a building.

5. The method of claim 1, wherein the passivation fluid comprises water.

6. The method of claim 1, wherein the dirty side of the filtration medium comprises a volatile powder.

7. The method of claim 1, wherein:
    the dirty side of the filtration medium comprises a volatile powder;
    continuing to pass the passivation fluid to the interior space comprises maintaining a valve in communication with the interior space in an open position; and
    stopping the passing of the passivation fluid to the interior space comprises moving the valve in communication with the interior space into a closed position.

8. The method of claim 1, wherein the filtration medium is cylindrically-shaped and wherein the dirty side is positioned on an outer perimeter of the filtration medium.

* * * * *